(12) United States Patent
Leung et al.

(10) Patent No.: US 8,826,805 B2
(45) Date of Patent: Sep. 9, 2014

(54) COOKING APPLIANCE

(75) Inventors: Leo Leung, Kowloon (HK); Joseoh W. Zakowski, New Cannan, CT (US); Barbara L. Schnabel, Chappaqua, NY (US); Maria Caruso, Stamford, CT (US)

(73) Assignee: Conair Corporation, Stamford, CT (US)

(*) Notice: Subject to any disclaimer, the term of this patent is extended or adjusted under 35 U.S.C. 154(b) by 0 days.

(21) Appl. No.: 13/397,990

(22) Filed: Feb. 16, 2012

(65) Prior Publication Data

US 2012/0213902 A1    Aug. 23, 2012

Related U.S. Application Data

(60) Provisional application No. 61/443,965, filed on Feb. 17, 2011.

(51) Int. Cl.
*A47J 27/04* (2006.01)

(52) U.S. Cl.
USPC ............... 99/348; 99/410; 99/510; 126/369; 366/147; 366/146

(58) Field of Classification Search
USPC .............. 99/348, 410, 509, 510, 511, 513; 366/144, 145, 146, 147; 126/369
See application file for complete search history.

(56) References Cited

U.S. PATENT DOCUMENTS

| | | | |
|---|---|---|---|
| 4,480,924 A * | 11/1984 | Preda | 366/102 |
| 5,284,085 A * | 2/1994 | Palm | 99/348 |
| 5,794,524 A | 8/1998 | Kemker et al. | |
| 6,076,452 A | 6/2000 | Dessuise | |
| 6,247,393 B1 * | 6/2001 | Chang | 99/348 |
| 6,505,545 B2 | 1/2003 | Kennedy et al. | |
| 6,550,372 B1 | 4/2003 | Sharples | |
| 7,617,766 B2 | 11/2009 | Tracy et al. | |
| 7,878,701 B2 | 2/2011 | Stephens et al. | |
| 2001/0022139 A1 * | 9/2001 | Kubicko et al. | 99/348 |
| 2004/0065211 A1 | 4/2004 | McNair | |
| 2007/0235019 A1 * | 10/2007 | Bargiacchi | 126/369 |
| 2011/0014342 A1 | 1/2011 | Picozza et al. | |
| 2011/0056388 A1 | 3/2011 | Lin | |

* cited by examiner

*Primary Examiner* — Reginald L Alexander
(74) *Attorney, Agent, or Firm* — McCormick, Paulding & Huber LLP

(57) ABSTRACT

A cooking appliance in accordance with the present invention includes a base, a container engageable with the base and configured to receive one or more food ingredients, a heater for converting a liquid into a cooking vapor and a blade assembly rotatably mounted in the container and having at least one vapor aperture located adjacent to a top of said blade assembly and at least one vapor outlet located adjacent to a bottom of said blade assembly.

13 Claims, 16 Drawing Sheets

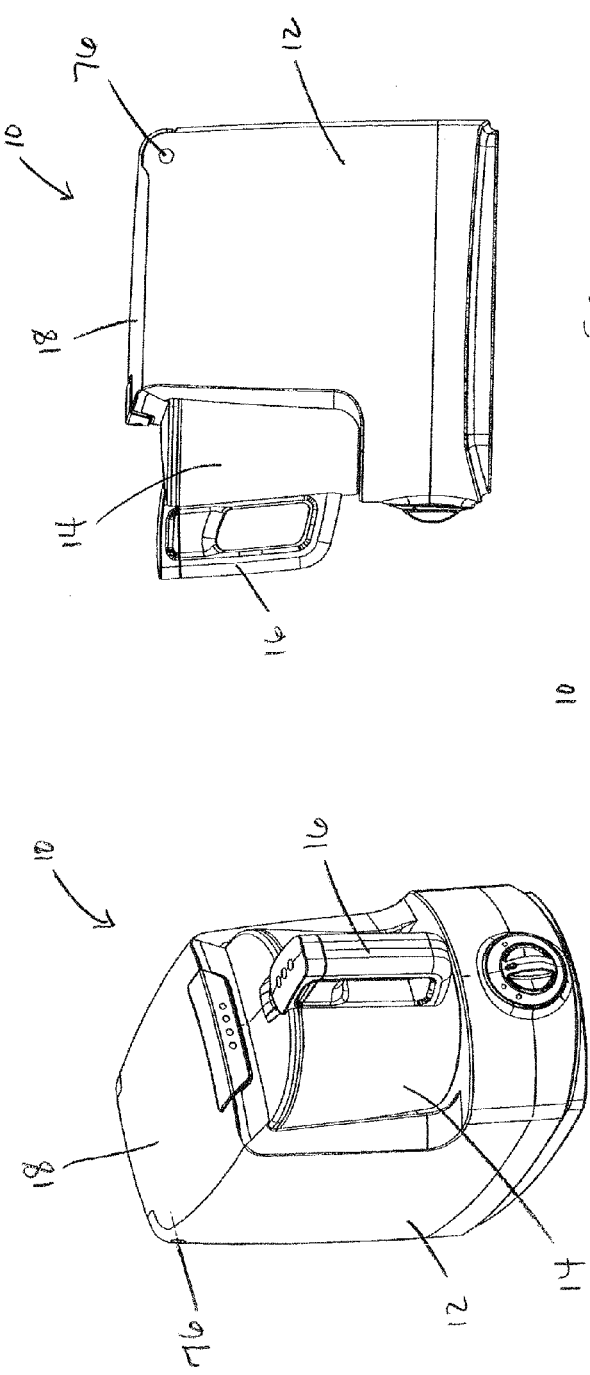
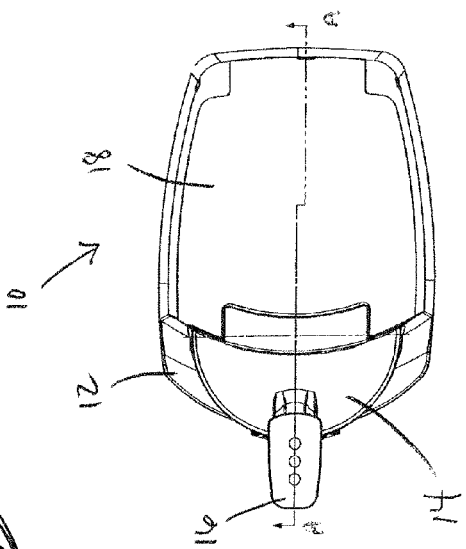

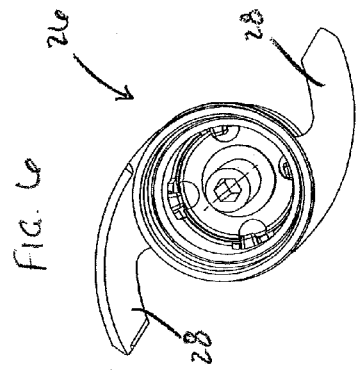
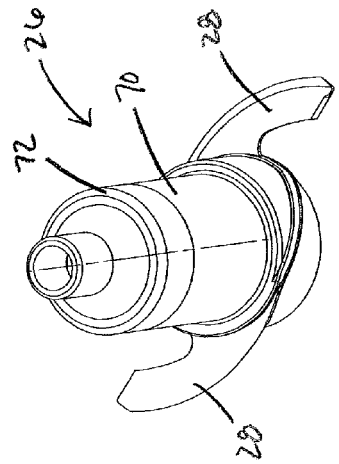
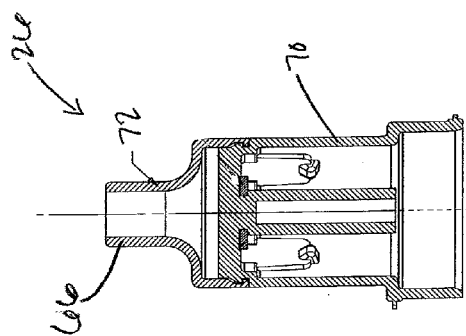
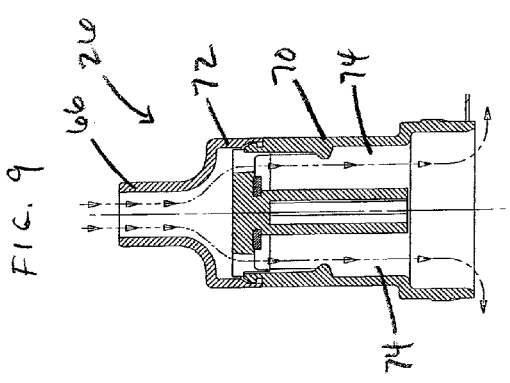
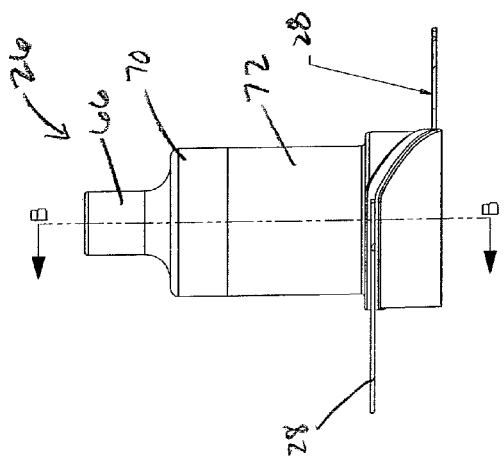
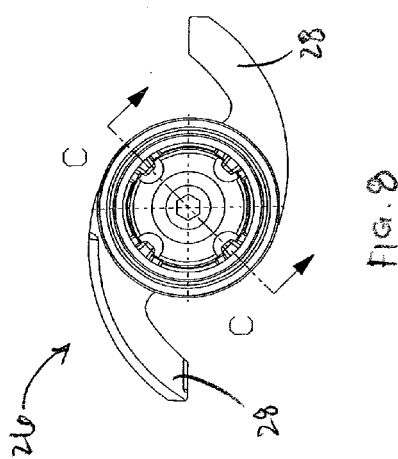

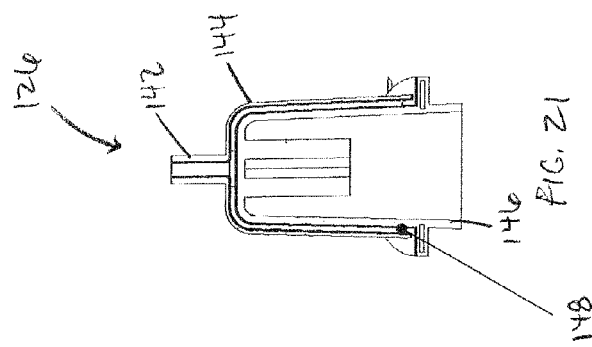
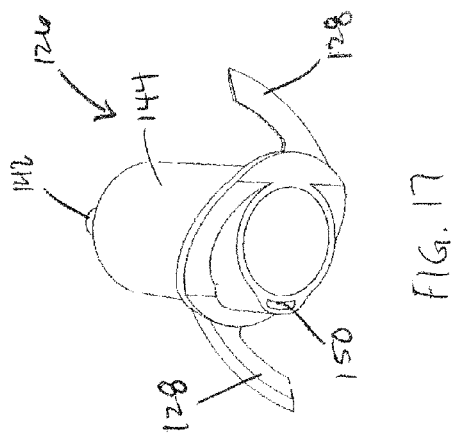
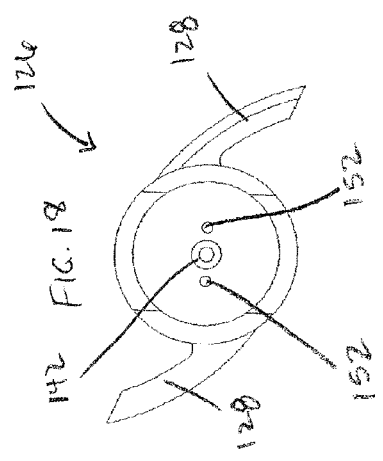
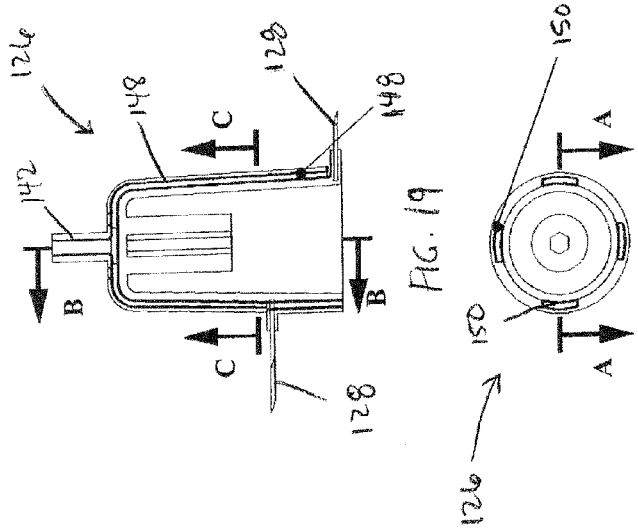

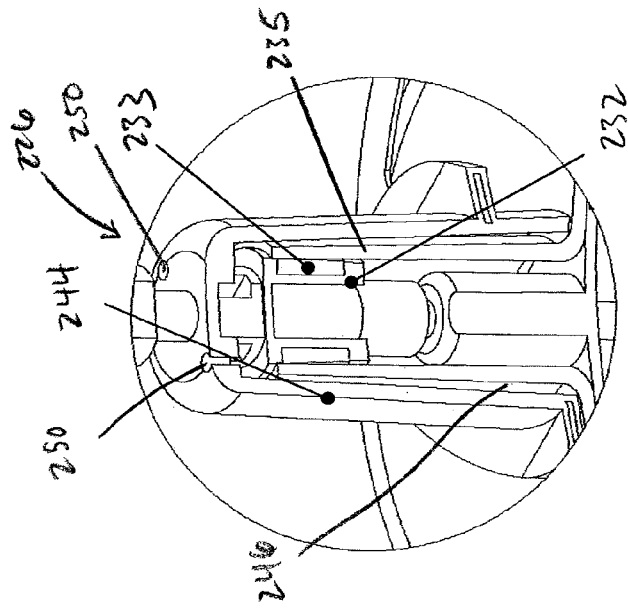
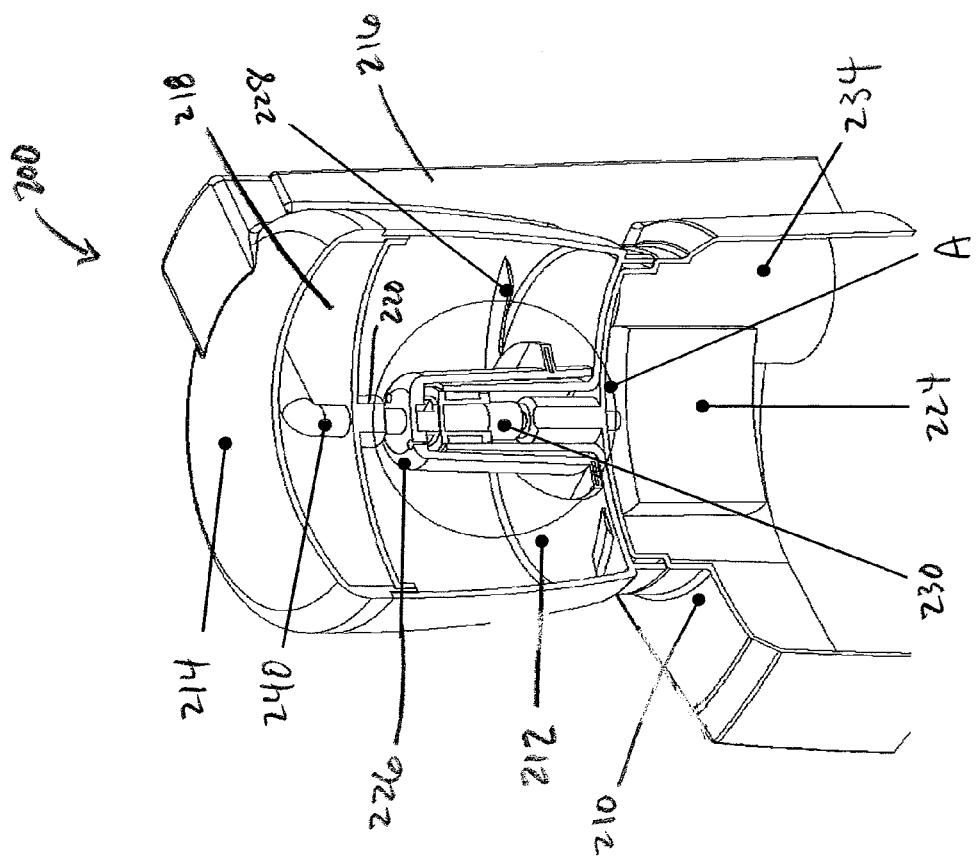
FIG. 23
FIG. 24

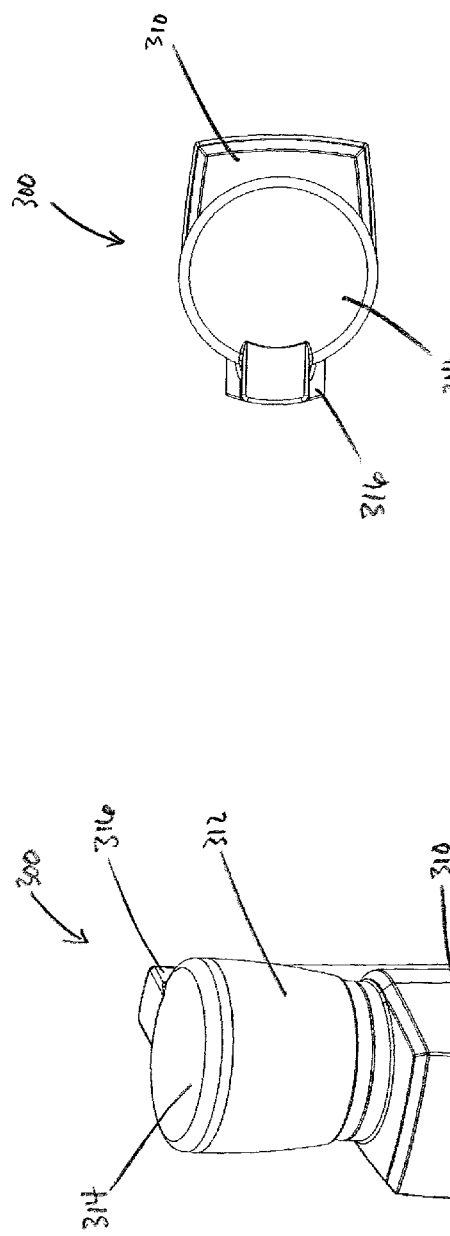

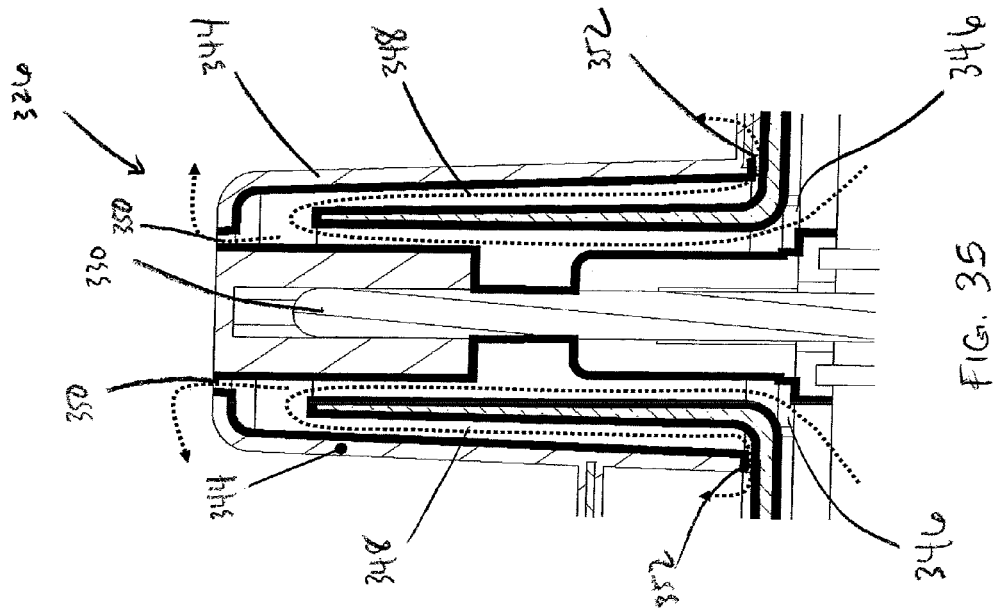
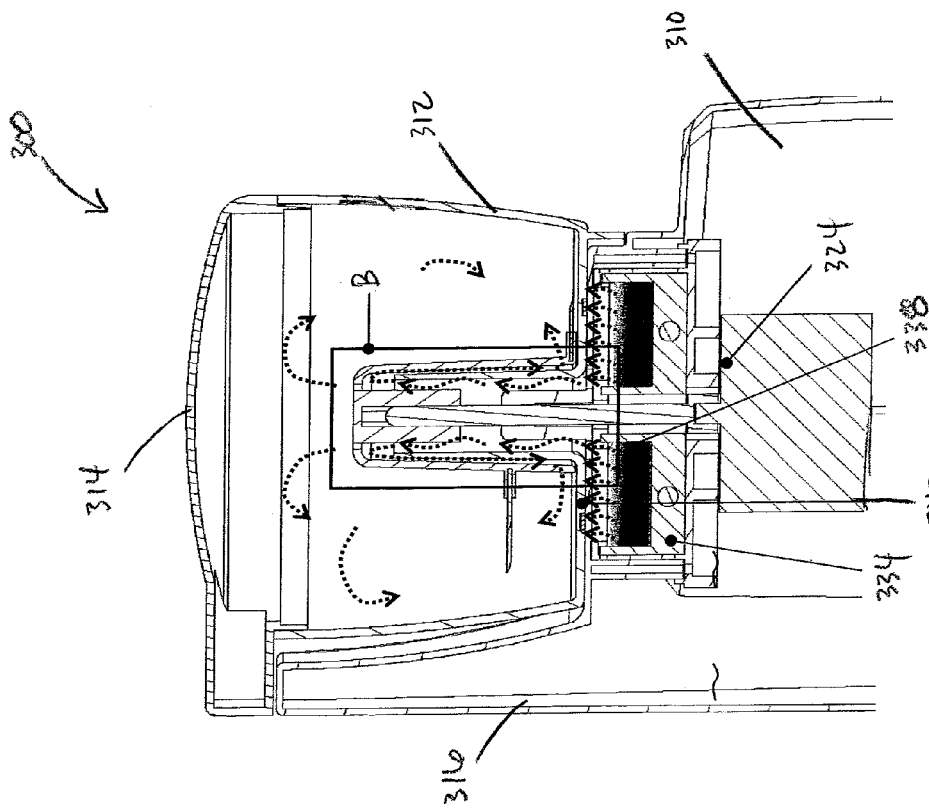

COOKING APPLIANCE

CROSS-REFERENCE TO RELATED APPLICATIONS

This application claims the benefit of U.S. Provisional Application Ser. No. 61/443,965, filed on Feb. 17, 2011, which is herein incorporated by reference in its entirety.

FIELD OF THE INVENTION

The present invention relates generally to cooking appliances and, more particularly, to counter-top cooking appliances for preparing food products by use of chopping, mixing, cutting and application of heat or steam.

BACKGROUND OF THE INVENTION

Various food appliances exist for processing (i.e., cutting, chopping, mixing) food ingredients and cooking them through the application of heat or steam. Certain known appliances that function in this manner and are adapted to fit on a countertop are used for preparation of baby food or infant food, but may also be used for preparing food products such as soups, dips, sauces and the like.

While existing food appliances are generally suitable for what is regarded as ordinary performance, there is room for improvement in terms of efficiency, convenience and effectiveness.

SUMMARY OF THE INVENTION

It is an object of the present invention to provide a cooking appliance that is adapted to efficiently, conveniently and effectively process and cook food ingredients.

It is another object of the present invention to provide a cooking appliance that utilizes the circulation of steam from top to bottom within a container to cook or heat food within the container.

These and other objects are achieved by the present invention.

A cooking appliance in accordance with the present invention includes a base, a container engageable with the base and configured to receive one or more food ingredients, a heater for converting a liquid into a cooking vapor and a blade assembly rotatably mounted in the container and having at least one vapor aperture located adjacent to a top of said blade assembly and at least one vapor outlet located adjacent to a bottom of said blade assembly.

BRIEF DESCRIPTION OF THE DRAWINGS

The present invention will be better understood from reading the following description of non-limiting embodiments, with reference to the attached drawings, wherein below:

FIG. 1 is a perspective view of a cooking appliance according to a first embodiment of the present invention.

FIG. 2 is a right side elevational view of the cooking appliance of FIG. 1.

FIG. 3 is top plan view of the cooking appliance of FIG. 1.

FIG. 5 is a perspective, bottom view of a blade assembly for use with the cooking appliance of FIG. 1.

FIG. 6 is a perspective, bottom view of the blade assembly of FIG. 5.

FIG. 7 is a front elevational view of the blade assembly of FIG. 5.

FIG. 8 is a bottom plan view of the blade assembly of FIG. 5.

FIG. 9 is a cross-sectional view of the blade assembly of FIG. 5, taken along line B-B of FIG. 7.

FIG. 10 is cross-sectional view of the blade assembly of FIG. 5, taken along line C-C of FIG. 8.

FIG. 17 is a perspective view of a blade assembly for use with the cooking appliance of FIG. 11.

FIG. 18 is a top plan view of the blade assembly of FIG. 17.

FIG. 19 is a cross-sectional view of the blade assembly of FIG. 17, taken along line A-A of FIG. 20.

FIG. 20 is a cross-sectional view of the blade assembly of FIG. 17, taken along line C-C of FIG. 19.

FIG. 21 is cross-sectional view of the blade assembly of FIG. 17, taken along line B-B of FIG. 19.

FIG. 23 is a partial cross-sectional view of the cooking appliance of FIG. 22, illustrating internal components thereof.

FIG. 24 is an enlarged, cross-sectional view of area A of FIG. 24.

FIG. 25 is an exploded, cross-sectional view of the cooking appliance of FIG. 22.

FIG. 28 is a perspective view of a cooking appliance according to another embodiment of the present invention.

FIG. 29 is a left side elevational view of the cooking appliance of FIG. 28.

FIG. 30 is a top plan view of the cooking appliance of FIG. 28.

FIG. 34 is a cross-sectional view of the cooking appliance of FIG. 28, illustrating a steam flow path.

FIG. 35 is an enlarged, cross-sectional view of area B of FIG. 28, illustrating the steam flow path.

DETAILED DESCRIPTION OF THE PREFERRED EMBODIMENT

Cooking appliances in accordance with the preferred embodiments of the present invention are directed, generally, to an appliance having a work bowl in which a rotatable blade assembly is positioned and, subsequently, the bowl is loaded with food ingredients to be processed and cooked. A cover is positioned over the bowl and water is added to a steam-producing chamber that is in communication with the bowl. The steam-producing chamber is heated to cause the water to boil and generate steam/cooking vapor. The steam travels into the bowl and contacts the food ingredients in order to heat or cook them. A certain amount of condensation from the steam is collected in the bowl and is combined with the food ingredients to form a puree, semi-liquid, or liquid as desired, and depending upon the specific ingredients and amounts.

Before, after, or during steaming, the food ingredients may be processed by the rotatable blade assembly. Depending on the blade and the chosen speed and duration of rotation, the food ingredients may be chopped, mixed or pureed.

Appliances according to the present invention include a single bowl design in which steaming and processing are carried out without the need to transfer the food ingredients to additional containers to carry out separate steaming and processing functions.

Figure 4:
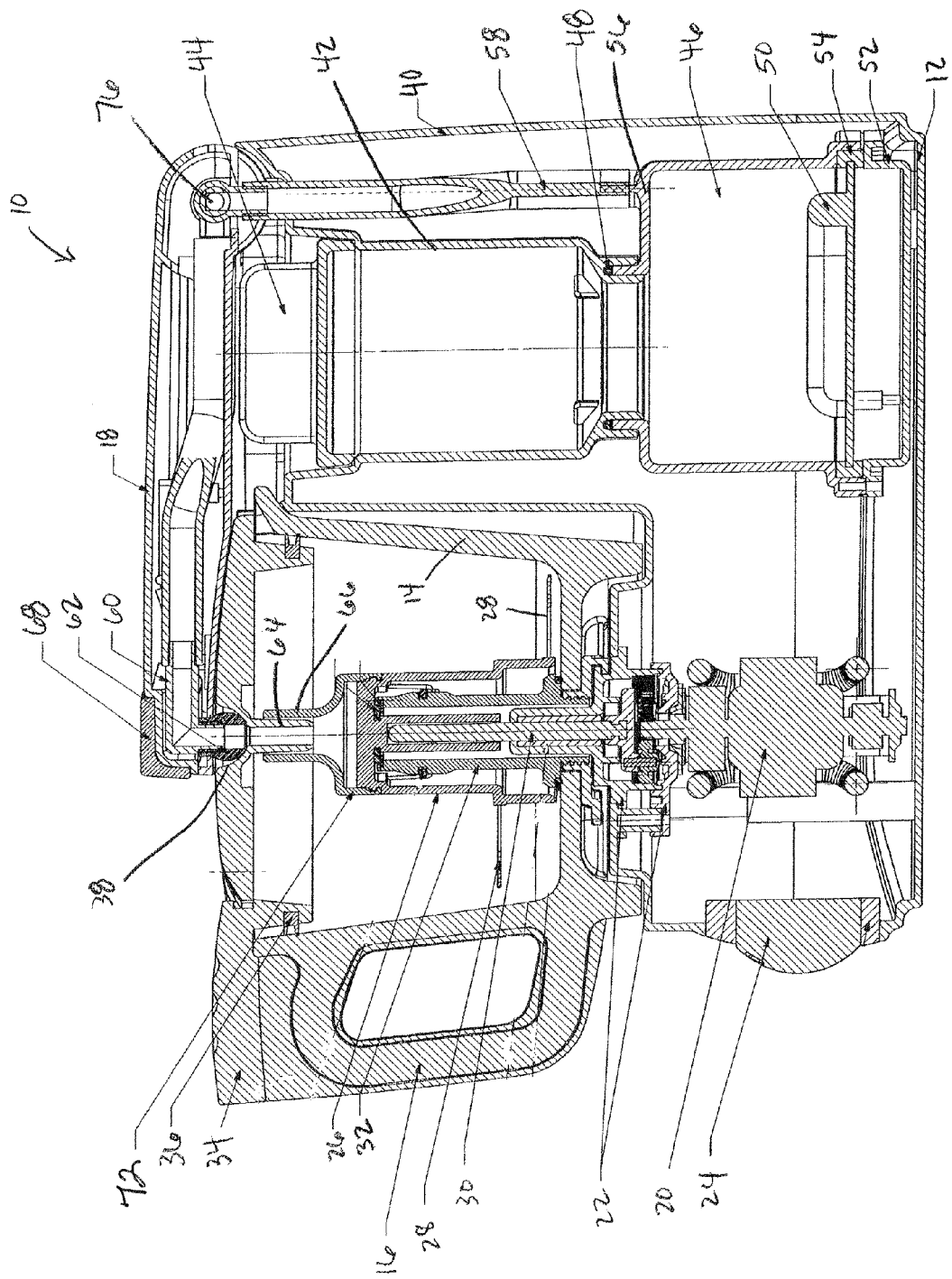
FIG. 4 is a cross-sectional view of the cooking appliance of FIG. 1, taken along A-A of FIG. 3.
Figure 11:
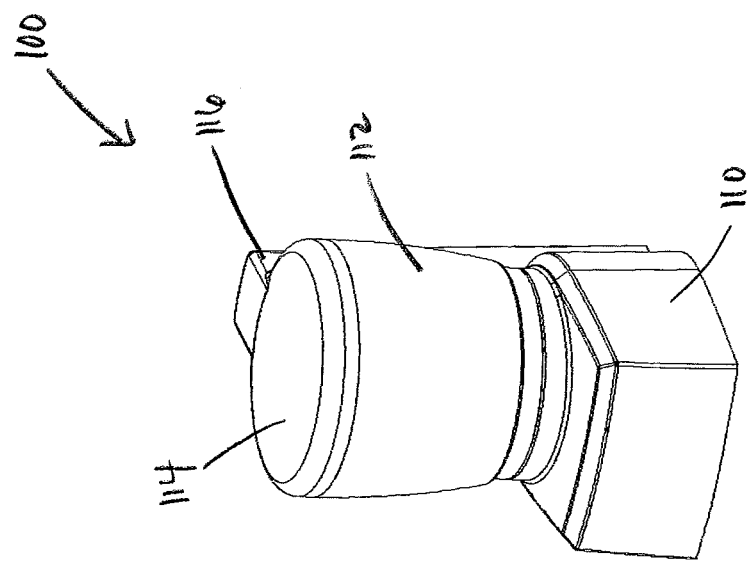
FIG. 11 is a perspective view of a cooking appliance in accordance with another embodiment of the present invention.

FIGS. 1-10 illustrate a first preferred embodiment of the present invention. With reference to FIG. 1, a cooking appliance 10 includes a base 12, a bowl/container 14 having a handle 16 releasably received on the base 12, and a lid 18 hingedly connected to the base and extending partially over the container 12. As best shown in FIG. 1, the base 12 houses an electric motor 20 and associated electrical and mechanical components associated with the motor, its drive output, the heat element, and controls, all of types generally known to those of ordinary skill in the art. For example, as shown in FIG. 4, a gearbox 22 may be associated with an output of the motor 20. An electrical cord (not shown) extends from the base 12 and plugs into and outlet of an external electrical power source. Control buttons or dials 24 of a type generally known to those of ordinary skill in the art, may be provided on the base 12 for enabling a user to control operation of the appliance 10 in the manner described herein.

With further reference to FIG. 4, a blade assembly 26 having a pair of blades 28 is rotatably mounted within the container 14. In particular, the blade assembly 26 is received on a rotatably driven output shaft 30 extending upwards from the base 12 through a center tube or chimney 32 of the container 14, as is known in the art. As discussed hereinafter, the blade assembly 26 functions to selectively chop, puree or blend food ingredients placed within the container 14.

The container 14, as further shown in FIG. 4, includes a cover 34 having a seal ring 36 formed around a periphery thereof. The cover 34 is removably securable to the container 14 such that the seal ring 36 contacts the inner periphery of the container 14 adjacent to a top opening thereof to form a substantially liquid and gas tight seal. In an embodiment, the seal ring 36 is formed from a resilient and deformable material such as rubber or the like. Importantly, the cover 34 includes an aperture or throughbore 38 formed therein and located directly above the chimney 32 for the purpose hereinafter disclosed.

As best shown in FIG. 4, the base 12 and upper housing 40 of the cooking appliance 10 include numerous components utilized to cook or heat the food ingredients within the container 14. In particular, the base 12 and upper housing 40 house a water tank or bottle 42 for holding a volume of water. The water bottle 42 includes a removable lid 44 to allow a user to fill the bottle 42 with water or other liquid. A bottom of the water bottle 42 is in selective fluid communication with a boiler chamber 46. A seal element 48 is positioned between the bottle 42 and chamber 46. A heater assembly including heating element 50 is configured directly below the boiler chamber 46 and is supported by heater holder 52. In an embodiment, the heating element may be an electrical resistance heating element, such as those known in the art, although other types of heating elements known in the art may also be utilized without departing from the broader aspects of the present invention. A boiler seal 54 is positioned around the heater assembly and forms a seal with the internal walls of the boiler chamber 46.

Moreover, as shown in FIG. 4, an outlet 56 of the boiler chamber is in fluid communication with a steam tube positioned in the upper housing 40. As shown therein, the steam tube includes a first portion 58 that extends substantially vertically from the boiler chamber 46 and a second portion 60 that extends substantially horizontally through the lid 18 of the appliance 10. The second portion 60 of the steam pipe terminates in a rubber head or gasket 62 that is received in the aperture 38 in the cover 34 of the container 14. Importantly, as shown in FIG. 4, the underside of the cover 34 has a male protrusion 64 that is received in a female portion 66 of the blade assembly 26, as discussed in detail below, such that the boiler chamber 46 is in fluid communication with an internal portion of the blade assembly 26.

As also shown in FIG. 4, the lid 18 of the appliance 10 includes a release button or latch 68 that selectively retains or releases the lid 18 from its closed position (its closed position is shown in FIG. 4).

During a cooking or heating step, water from the water bottle 42 is released into the boiler chamber 46. The heating element 50 functions to heat the water within the chamber 46 until it boils and turns into water vapor or steam. The produced steam is then routed to the top of the container 14 via the steam pipe (including portions 58, 60), through aperture 38 in the cover 34 and into the blade assembly 26.

With reference to FIGS. 5-10, the configuration of the blade assembly 26 is shown. As best shown in FIG. 5, the blade assembly includes an outer housing or blade holder 70 that functions to retain the pair of opposed blades 28. In an embodiment, the blades may be generally S-shaped blades. A cover 72 including female portion 66 is operatively connected to the holder 70. As best shown in FIGS. 6 and 10, the interior portion of the blade assembly 26 comprises a generally open cavity defining steam/vapor channels 74 through which steam may flow, as indicated by the arrows in FIG. 10. As will be readily appreciated, the vapor channels 74 function to guide vapor from the steam tubes 58, 60 (and ultimately form the boiler chamber 46) to one or more vapor outlets on the blade assembly 26. In an embodiment, the vapor may exit the vapor channels 74 at a generally open bottom end of the blade assembly 26, as shown in FIG. 10.

In operation, a user may actuate release button 68 and pivot the lid 18 away from the base 12 above hinge 76. In this position, a user may then access the water bottle 42 and cap 44 in order to fill the bottle with water or other liquid. Likewise, in this position, a user may remove the container 14 from the base 12, and one or more food ingredients may be placed in the container 14. The cover 34 may then be reattached to the container 14 such that male protrusion 64 is received in female portion 66 of the blade assembly 26, and such that seal ring 36 provides a substantially water-tight seal between the cover 34 and the container 14. The container 14 may then be engaged on the base 12 and the lid 18 pivoted to its closed and ready position, as shown in FIG. 4

A user may then control operation of the appliance 10 from the base 12 using control knob 24. In an embodiment, the appliance 10 may chop or puree the food ingredients within the container 14 utilizing the blades 28 of blade assembly 26.

The heating element 50 may then be activated to produce steam to cook or heat the chopped or pureed food ingredients within the container 14. In other embodiments, the food ingredients may be heated or cooked first via steam from the boiler chamber 46, then chopped or pureed by the blade assembly 26. In yet other embodiments, the chopping/pureeing and cooking/heating functions may be carried out simultaneously.

As noted above, importantly, vapor or steam is produced in a boiler chamber housed in the base 12 of the appliance and is routed through the steam tubes 58, 60 to the top of the appliance 10. Notably, the steam is then directed through the cover 34 of the container, through the top of the blade assembly 26, and down through the blade assembly 26 where it exits at a bottom thereof to cook the food ingredients within the container 14.

As will be readily appreciated, the cooking and chopping processes may be controlled by a microprocessor (not shown). In particular, the microprocessor can control the duration and sequence of the cooking and chopping processes. Moreover, the microprocessor may include memory for storing procedures specific to the type of food being processed.

As noted above, the cooking appliance 10 of the present invention permits steaming/cooking and processing of food ingredients within a single bowl, thereby obviating the need to transfer the food ingredients to additional/separate containers to carry out separate steaming and processing functions.

Referring to FIGS. 11-21, a cooking appliance 100 according to a second embodiment of the present invention is disclosed. The cooking appliance 100 is generally similar in configuration and function to the cooking appliance 10 described above and includes a base 110, a bowl or container 112, and a lid 114 releasably attached to the top rim of the container 112. In an embodiment, the lid 114 may be pivotally connected to an upper housing 116 extending from the base 112 via a hinge or the like.

Figure 12:
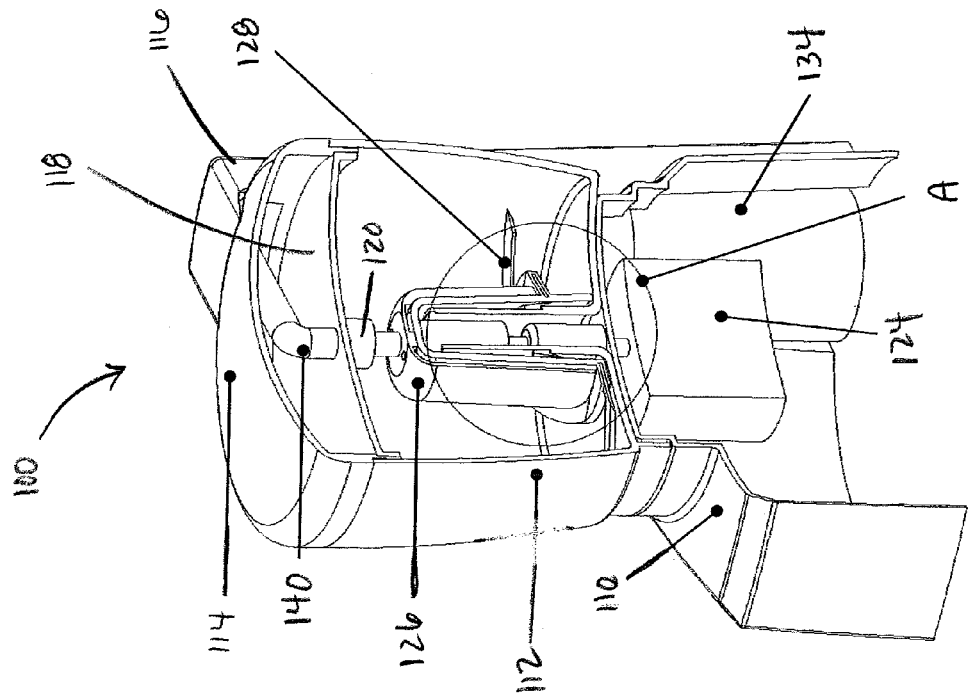
FIG. 12 is a partial cross-sectional view of the cooking appliance of FIG. 11, illustrating internal components thereof.
Figure 14:
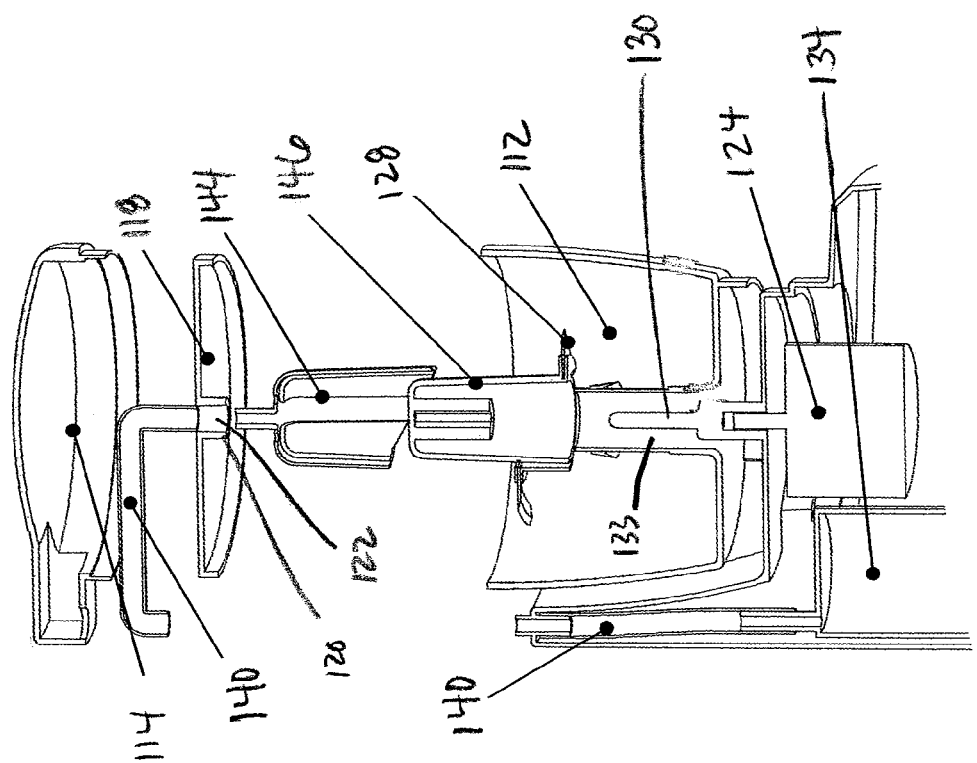
FIG. 14 is an exploded, cross-sectional view of the cooking appliance of FIG. 11.

As best shown in FIGS. 12 and 14, a container cover 118 forms a part of the lid 114 and has downwardly depending projection 120 having a throughbore 122 formed therethrough. The projection 120 and throughbore 122 are formed in the center of the cover 118 and are positioned directly above a motor output shaft, as discussed below.

As shown in FIG. 12, the base 110 houses an electric motor 124 and associated electrical and mechanical components (not shown) associated with the motor, its drive output, the heat element, and controls, all of types generally known to those of ordinary skill in the art. An electrical cord (not shown) extends from the base 110 and plugs into and outlet of an external electrical power source. Control buttons or dials (not shown), of a type generally known to those of ordinary skill in the art, may be provided on the base 110 for enabling a user to control and operate the appliance 100.

Figure 13:
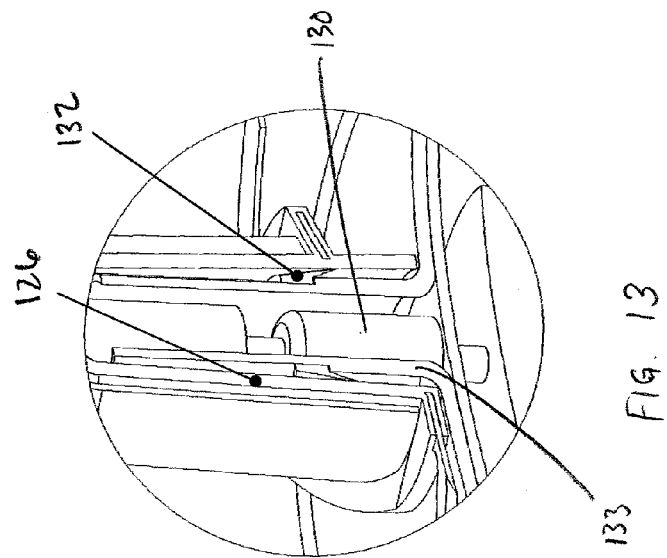
FIG. 13 is an enlarged, cross-sectional view of area A of FIG. 12.
Figure 15:
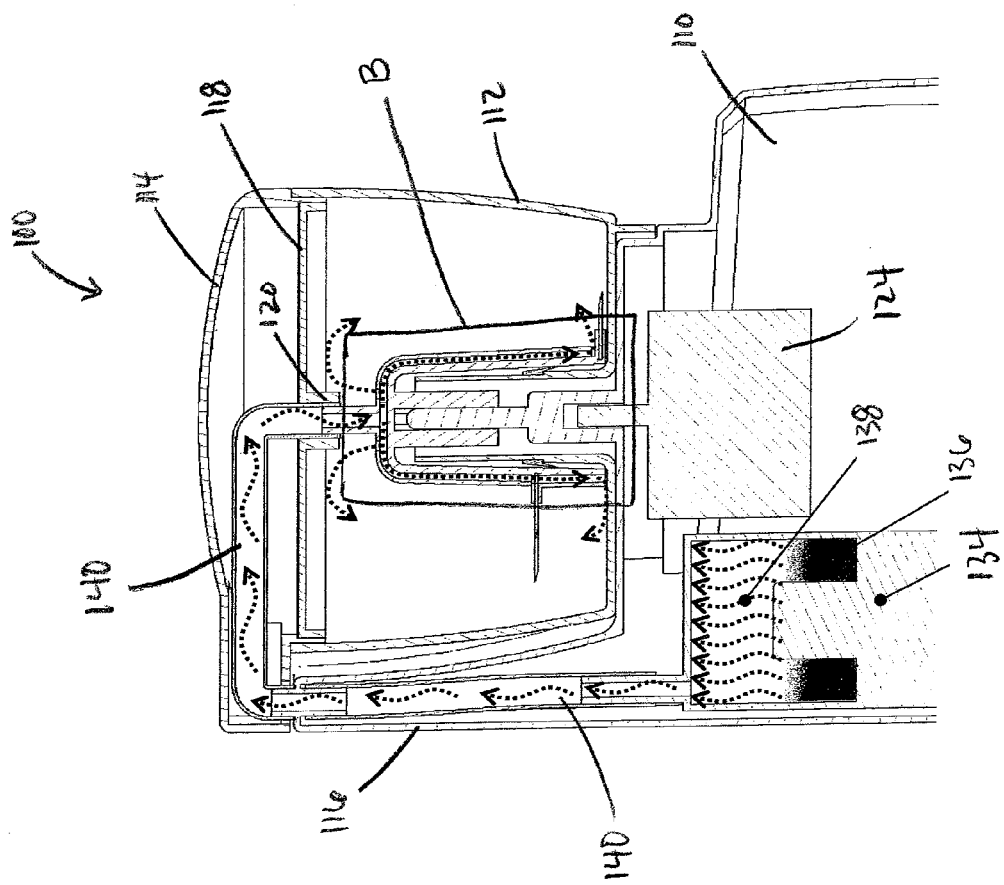
FIG. 15 is a cross-sectional view of the cooking appliance of FIG. 11, illustrating a steam flow path.
Figure 22:
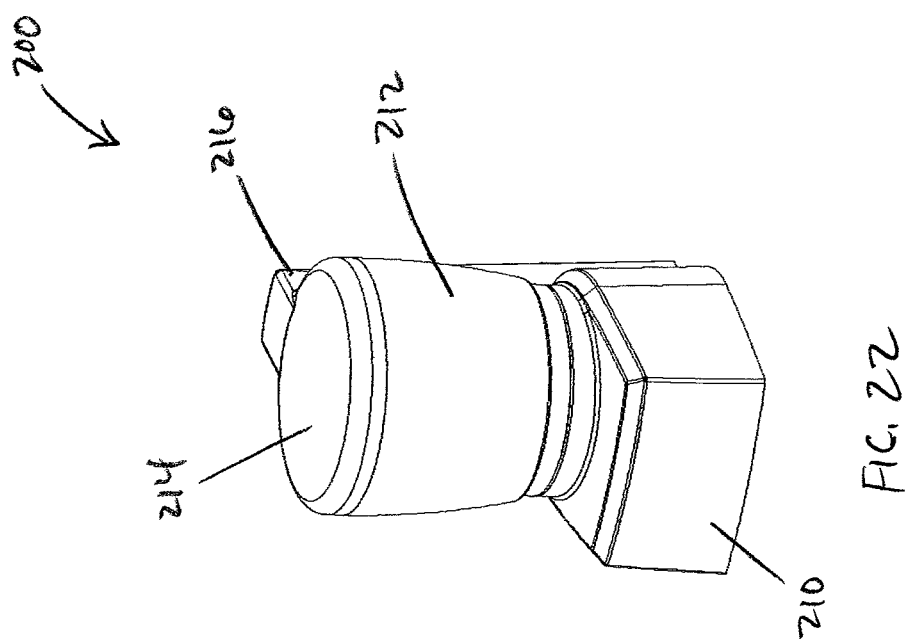
FIG. 22 is a perspective view of a cooking appliance according to another embodiment of the present invention.

As further shown in FIGS. 12 and 15, a blade assembly 126 having a plurality of blades 128 is rotatably mounted within the container 112 in a similar manner to that described above. In particular, the blade assembly 126 is rotatably mounted to a driven output shaft 130 extending from the base 110 and through an opening (not shown) in the floor of the container 112. As shown in FIG. 13, a resilient seal 132 is provided within the blade assembly 126. The seal 132 engages a chimney 133 of the container 112 on which the blade assembly 126 is mounted.

With further reference to FIGS. 12, 14 and 15, the base 110 also houses a boiler 134. The boiler 134 may be of the type known in the art, and includes a heating element for heating a volume of water or other liquid 136 within the boiler 134 for turning the liquid 136 into a cooking vapor or steam 138. A vapor/steam channel or tube 140 is in fluid communication with the boiler 134 and extends from the boiler 134, up through the upper housing 116, through a space between the lid 114 and container cover 118, and down through the throughbore 122 in the cover 118.

As best shown in FIGS. 14 and 15, a hub 142 extending upwards from the top of the blade assembly 126 is engaged by the depending projection 120 of the cover 118. In this manner, an internal cavity of the blade assembly 126 is in fluid communication with the steam tube 140, and thus with the boiler 134. During a cooking or heating step, water 136 is transformed into a cooking vapor/steam 138 within the boiler 134. The steam 138 is routed to the top of the container 112 through the steam tube 140, through throughbore 122 of the cover 118 and into the blade assembly 126.

Figure 16:
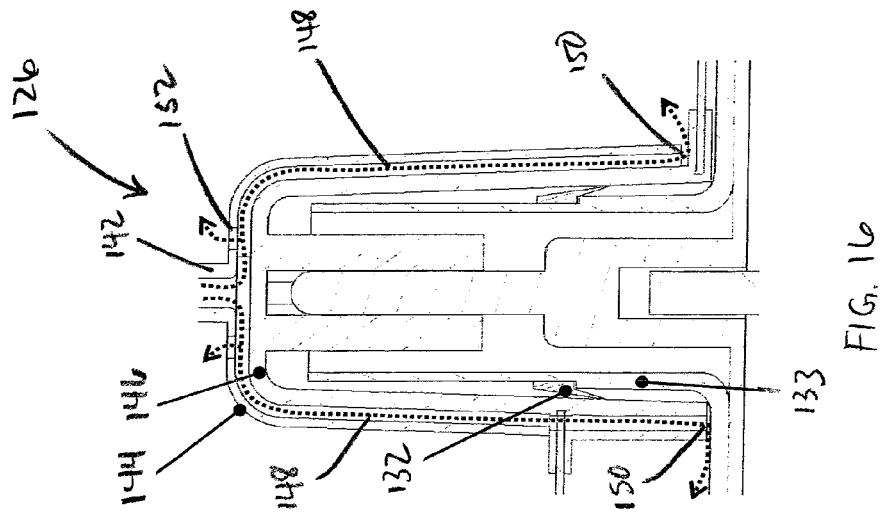
FIG. 16 is an enlarged, cross-sectional view of area B of FIG. 15, illustrating the steam flow path.

With reference to FIGS. 16-21, the configuration of the blade assembly 126 is shown. As shown therein, the blade assembly 126 includes an outer housing or cover 144 and a blade bracket 146 received therein that holds the pair of opposed blades 128. In an embodiment, the blades may be generally S-shaped blades. As best shown in FIG. 16, steam passageways 148 are formed between the cover 144 and blade bracket 146 and terminate in outlets 150 adjacent to the bottom of the blade assembly 126. In the preferred embodiment there are four outlets adjacent to the bottom of the blade assembly 126, although more or fewer outlets may be utilized without departing from the broader aspects of the present invention. A pair of apertures 152 are formed in the cover 144 at a top of the blade assembly 126 and provide a passageway for steam to escape into the container 112. As shown in FIGS. 15 and 16, therefore, the outlets 150 adjacent to the bottom of the blade assembly 126 allow steam to enter the container 112 at the bottom thereof, and the apertures 152 at the top of the blade assembly 126 permit steam to enter the container 112 at the top thereof. Importantly, this configuration of steam outlets 150, 152 in the blade assembly 126 facilitates the efficient and expedited cooking of food ingredients within the container 112.

As will be readily appreciated, the cooking appliance 100 according to the second preferred embodiment functions in much the same manner to cook/heat and process food as cooking appliance 10. In particular, as noted above, vapor or steam is produced in the boiler 134 in the base 110 of the appliance and is routed through steam tube 140 to the top of the appliance 100. Importantly, the steam is then directed through the cover 118 of the container, through the top of the blade assembly 126, and down through the channels 148 within the blade assembly 126 where is it exits through apertures 152 and outlets 150. The steam flow path from the boiler 134 to the container 112 is best represented by the dashed arrows in FIG. 15. The steam flow path through the blade assembly 126 is best illustrated by the dashed arrows in FIG. 16. Notably, because steam is permitted to enter the container 112 at a top and bottom thereof, circulation through the food ingredients within the container 112 is facilitated, thereby providing faster and more even cooking than is the case with existing devices.

Referring to FIGS. 22-27, a cooking appliance 200 according to a third embodiment of the present invention is disclosed. The cooking appliance 200 is generally similar in configuration and function to the cooking appliance 100 described above and includes a base 210, a bowl or container 212, and a lid 214 releasably attached to the top rim of the container 212. In an embodiment, the lid 214 may be pivotally connected to an upper housing 216 extending from the base 212 via a hinge or the like.

As best shown in FIGS. 23 and 25, a container cover 218 forms a part of the lid 214 and has downwardly depending projection 120 having a throughbore 122 formed therethrough. The projection 220 and throughbore 222 are formed in the center of the cover 218 and are positioned directly above a motor output shaft, as discussed below.

As shown in FIG. 23, the base 210 houses an electric motor 224 and associated electrical and mechanical components (not shown) associated with the motor, its drive output, the heat element, and controls, all of types generally known to those of ordinary skill in the art. An electrical cord (not shown) extends from the base 210 and plugs into and outlet of an external electrical power source. Control buttons or dials (not shown), of a type generally known to those of ordinary skill in the art, may be provided on the base 210 for enabling a user to control and operate the appliance 200.

Figure 26:
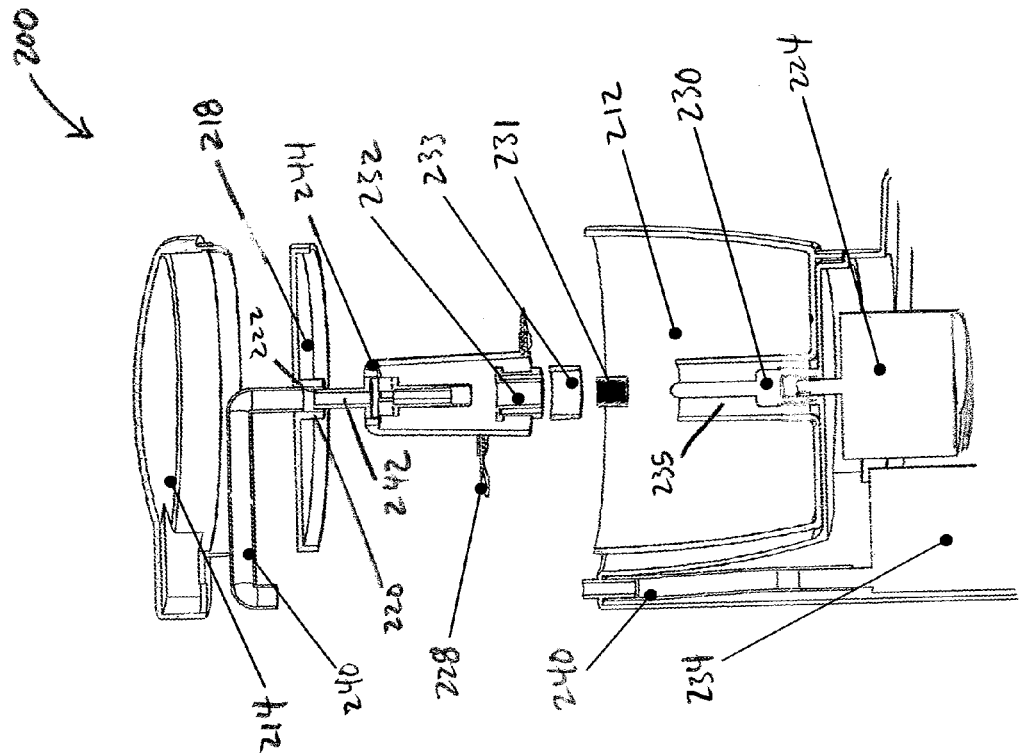
FIG. 26 is a cross-sectional view of the cooking appliance of FIG. 22, illustrating a steam flow path.

As further shown in FIGS. 23, 24 and 26, a blade assembly 226 having a plurality of blades 228 is rotatably mounted within the container 212 in a similar manner to that described above. In particular, the blade assembly 226 is rotatably mounted to a driven output shaft 230 (via a nut and O-ring 231) extending from the base 210 and through an opening (not shown) in the floor of the container 212. As shown in FIG. 24, a resilient seal such as silicone bracket 232 and a silicone band 233 is provided within the blade assembly 226. The silicone bracket 232 and band 233 engage interior walls of a chimney 235 of the container 212 on which the blade assembly 226 is mounted to releasably secure the blade assembly 226 to the container 212.

With further reference to FIGS. 23, 25 and 26, the base 210 also houses a boiler 234. The boiler 134 may be of the type known in the art, and includes a heating element for heating a volume of water or other liquid 236 within the boiler 234 for turning the liquid 236 into a cooking vapor or steam 238. A vapor/steam channel or tube 240 is in fluid communication with the boiler 234 and extends from the boiler 234, up through the upper housing 216, through a space between the lid 214 and container cover 218, and down through the throughbore 222 in the cover 218.

Figure 27:
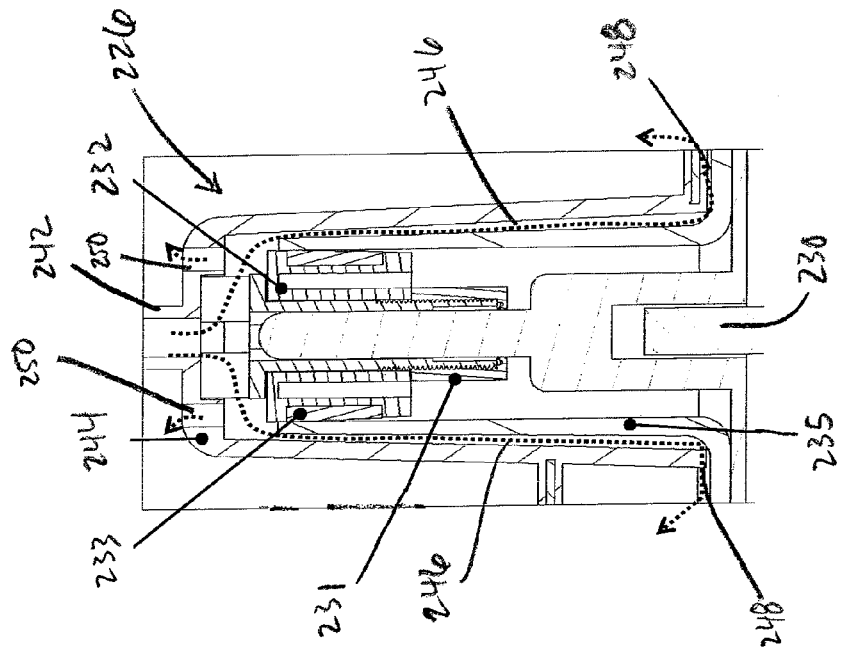
FIG. 27 is an enlarged, cross-sectional view of area B of FIG. 26, illustrating the steam flow path.
Figure 26:
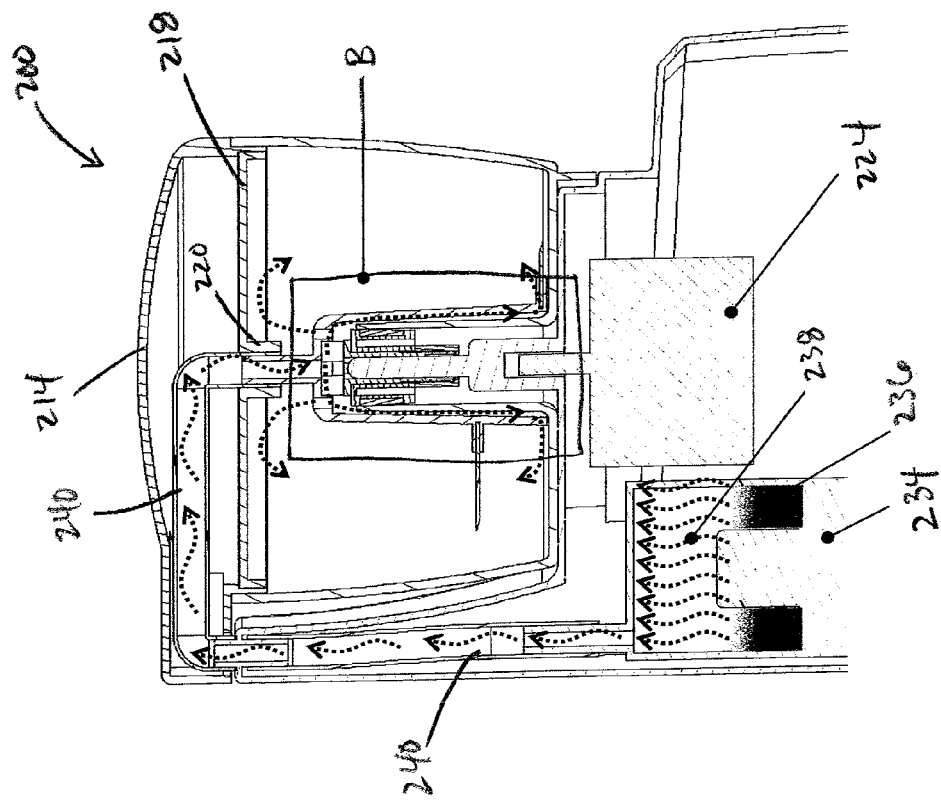

As best shown in FIGS. 25 and 27, a hub 242 extending upwards from the top of the blade assembly 226 is engaged by the depending projection 220 of the cover 218. In this manner, an internal cavity of the blade assembly 226 is in fluid communication with the steam tube 240, and thus with the boiler 234. During a cooking or heating step, water 236 is transformed into a cooking vapor/steam 238 within the boiler 234. The steam 238 is routed to the top of the container 212 through the steam tube 240, through throughbore 222 of the cover 218 and into the blade assembly 226.

With reference to FIGS. 24 and 27, the blade assembly 226 includes a blade bracket or outer cover 244 that retains the pair of opposed blades 128. In an embodiment, the blades may be generally S-shaped blades. As best shown in FIG. 16, steam passageways 246 are formed between the cover 246 and the chimney 235 of the container 212 and terminate in outlets 248 adjacent to the bottom of the blade assembly 226. A pair of apertures 250 are formed in the cover 244 at a top of the blade assembly 226 and provide a passageway for steam to escape into the container 212. As shown in FIGS. 26 and 27, therefore, the outlets 248 adjacent to the bottom of the blade assembly 226 allow steam to enter the container 212 at the bottom thereof, and the apertures 250 at the top of the blade assembly 226 permit steam to enter the container 212 at the top thereof. Importantly, this configuration of steam outlets 248, 250 in the blade assembly 226 facilitates the efficient and expedited cooking of food ingredients within the container 212.

As will be readily appreciated, the cooking appliance 200 according to the third preferred embodiment functions in much the same manner to cook/heat and process food as cooking appliances 10, 100. In particular, as noted above, vapor or steam is produced in the boiler 234 in the base 210 of the appliance and is routed through steam tube 240 to the top of the appliance 100. Importantly, the steam is then directed through the cover 218 of the container 212, through the top of the blade assembly 226, and down through the channels 246 within the blade assembly 226 where is it exits through apertures 250 and outlets 248. The steam flow path is best represented by the dashed arrows in FIG. 26. The steam flow path through the blade assembly 226 is best illustrated by the dashed arrows in FIG. 27. Notably, because steam is permitted to enter the container 212 at a top and bottom thereof, circulation through the food ingredients within the container 212 is facilitated, thereby providing faster and more even cooking than is the case with existing devices.

Referring to FIGS. 28-35, a cooking appliance 300 according to a fourth embodiment of the present invention is disclosed. The cooking appliance 300 is generally similar in configuration and function to the cooking appliances 100, 200 described above and includes a base 310, a bowl or container 312, and a lid 314 releasably attached to the top rim of the container 312. In an embodiment, the lid 314 may be pivotally connected to an upper housing 316 extending from the base 312 via a hinge or the like.

Figure 31:
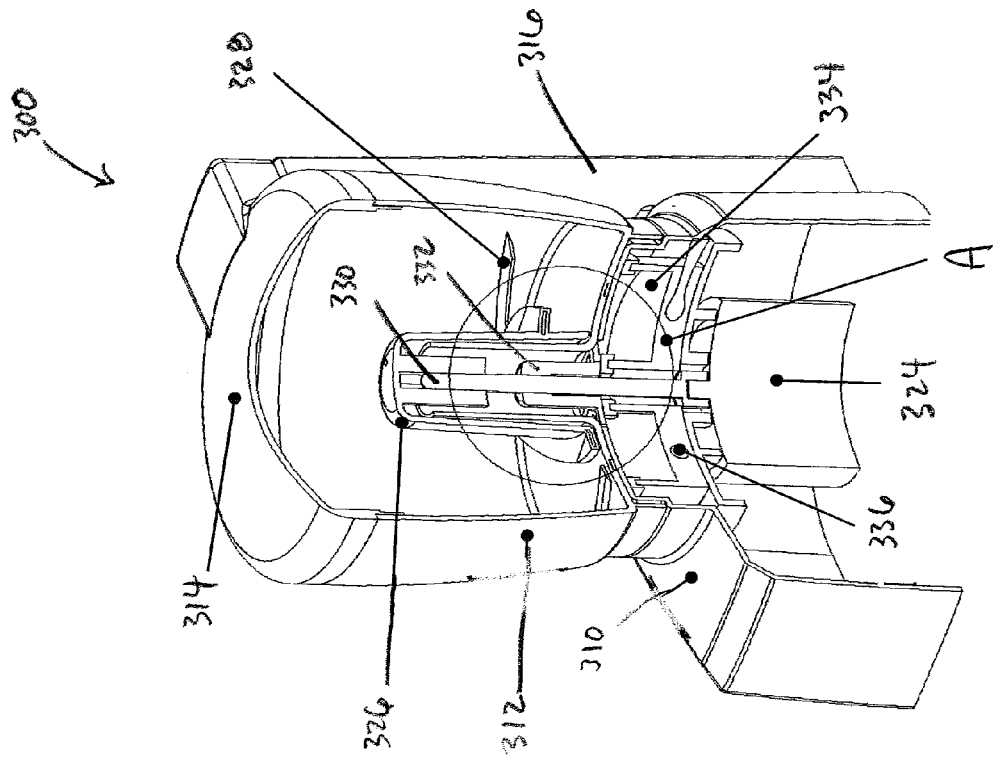
FIG. 31 is a partial cross-sectional view of the cooking appliance of FIG. 28, illustrating internal components thereof.

As shown in FIG. 31, the base 310 houses an electric motor 324 and associated electrical and mechanical components (not shown) associated with the motor, its drive output, the heat element, and controls, all of types generally known to those of ordinary skill in the art. An electrical cord (not shown) extends from the base 310 and plugs into and outlet of an external electrical power source. Control buttons or dials (not shown), of a type generally known to those of ordinary skill in the art, may be provided on the base 310 for enabling a user to control and operate the appliance 300.

Figure 33:
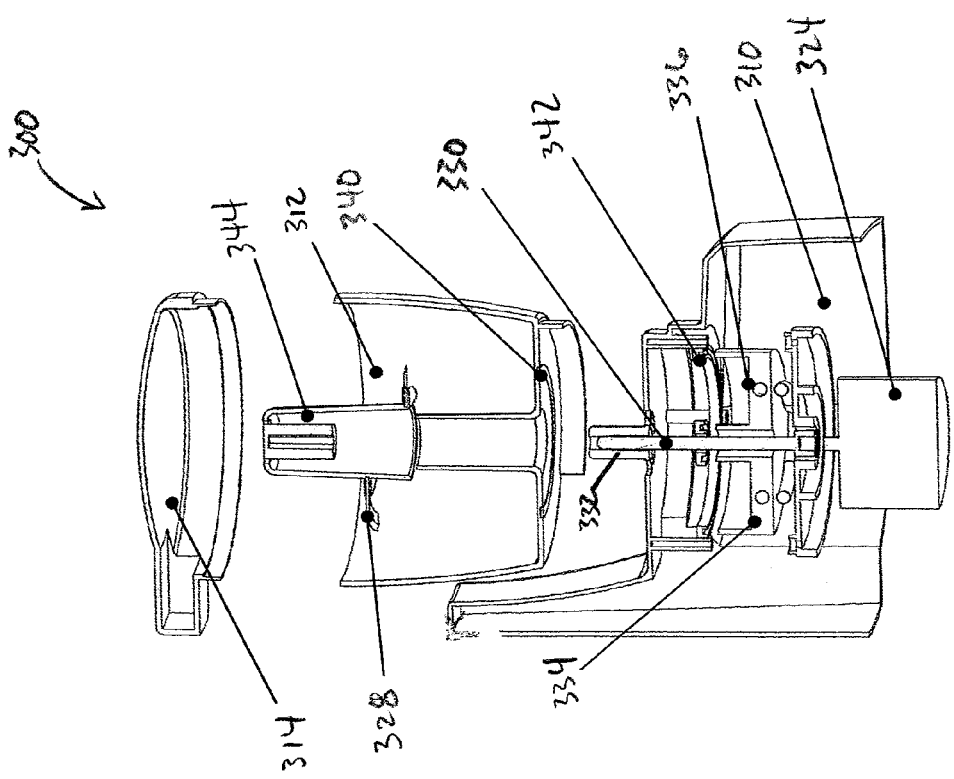
FIG. 33 is an exploded, cross-sectional view of the cooking appliance of FIG. 28.

As further shown in FIGS. 31, 33 and 34, a blade assembly 326 having a plurality of blades 328 is rotatably mounted within the container 312 in a similar manner to that described above. In particular, the blade assembly 326 is rotatably mounted to a driven output shaft 330 extending from the base 210, through an opening (not shown) in the floor of the container 312 and through chimney 332 of the container 312.

With further reference to FIGS. 31, 33 and 34, the base 310 also houses a boiler 334 disposed directly below the container 312. The boiler 334 may be of the type known in the art, and includes a heating element 336 for heating a volume of water or other liquid 338 within the boiler 334 for turning the liquid 338 into a cooking vapor or steam 340. Importantly, the bottom of the container 312 has a silicone seal ring 340 and the boiler has a boiler seal 342 that function to prevent the escape of steam from the appliance 300.

Figure 32:
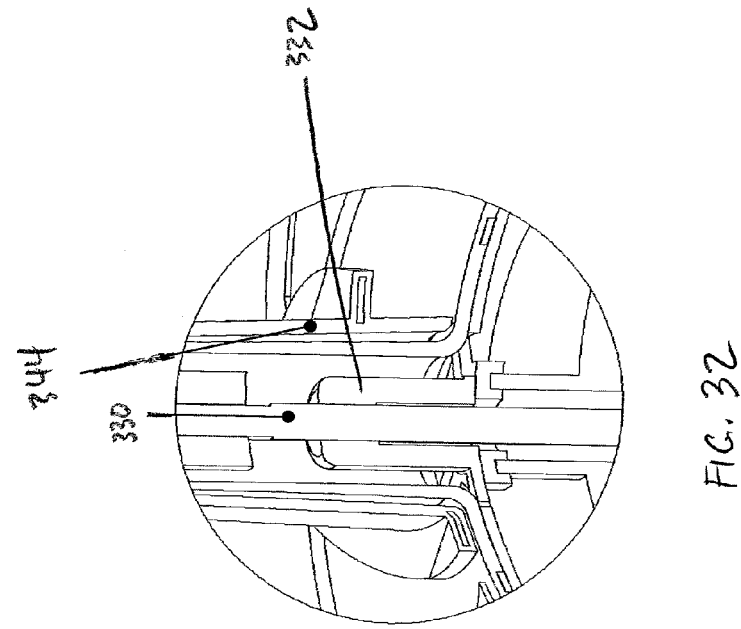
FIG. 32 is an enlarged, cross-sectional view of area A of FIG. 31.

With reference to FIGS. 32, 33 and 35, the blade assembly 326 includes a blade hub 344, through which steam from the boiler 334 is permitted to enter. During a cooking or heating step, water 338 is transformed into a cooking vapor/steam 340 within the boiler 334. The steam 340 rises form the boiler chamber 334 and enters the blade hub 344 of the blade assembly 326 through ports of ingress 346 located at the bottom thereof, as shown in FIG. 35.

As further shown in FIG. 35, steam passageways 348 formed within the blade hub 344 direct the steam therethrough. A pair of apertures 350 are formed in the blade hub 344 at a top thereof, and outlets in the bottom of the blade hub 344, provide passageways for steam to escape into the container 312. In particular, outlets 352 adjacent to the bottom of the blade assembly 352 allow steam to enter the container 312 at the bottom thereof, and the apertures 350 at the top of the blade assembly 326 permit steam to enter the container 312 at the top thereof. Importantly, this configuration of steam outlets 350, 352 in the blade assembly 326 facilitates the efficient and expedited cooking of food ingredients within the container 312.

As will be readily appreciated, the cooking appliance 300 according to the fourth preferred embodiment functions in much the same manner to cook/heat and process food as cooking appliances 10, 100, 200. In particular, as noted above, vapor or steam is produced in the boiler 334 in the base 310 of the appliance and is routed to the blade assembly 326. Importantly, the steam is then directed through the channels 348 within the blade assembly 326 where is it exits through apertures 350 and outlets 352. The steam flow path is best represented by the dashed arrows in FIG. 34. The steam flow path through the blade assembly 326 is best illustrated by the dashed arrows in FIG. 35. Notably, because steam is permitted to enter the container 312 at a top and bottom thereof, circulation through the food ingredients within the container 312 is facilitated, thereby providing faster and more even cooking than is the case with existing devices, as noted previously. Moreover, because of this configuration, circulation of the steam within the containers is from top to bottom.

As with the cooking appliance 10 disclosed above, the cooking/heating and chopping processes of cooking appliances 100, 200, 300 may be controlled by a microprocessor (not shown). In particular, the microprocessor can control the duration and sequence of the cooking and chopping processes. Moreover, the microprocessor may include memory for storing procedures specific to the type of food being processed.

As noted above, the cooking appliances 100, 200, 300 of the present invention permits steaming/cooking and processing of food ingredients within a single bowl, thereby obviating the need to transfer the food ingredients to additional/separate containers to carry out separate steaming and processing functions. Moreover, due to the fact that the respective blade assemblies have steam/vapor outlets in the top and bottom thereof, steam circulation, and therefore cooking time within the respective containers, is improved.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A cooking appliance, comprising:
a base;
an electric motor housed in said base, said electric motor including an output shaft extending upwards from said base;
a container engageable with said base and configured to receive one or more food ingredients;
a heater for converting a liquid into a cooking vapor; and
a blade assembly rotatably coupled to said output shaft of said motor and mounted within said container, said blade assembly including a body having a top hub defining a passageway leading to an interior of said body;
a boiler chamber; and
a vapor conduit having an inlet in fluid communication with an outlet of said boiler chamber and an outlet in fluid communication with said top hub of said blade assembly;
wherein said blade assembly includes at least one vapor aperture in a top of said body and at least one vapor outlet located adjacent to a bottom of said blade assembly, said at least one vapor aperture and said at least one vapor outlet allowing the egress of cooking vapor from said interior of said body into said container.

2. The cooking appliance of claim 1, wherein:
said blade assembly has an inlet formed in a bottom thereof for receiving said cooking vapor.

3. The cooking appliance of claim 1, wherein:
said vapor aperture and said vapor outlet are configured to circulate said cooking vapor within said container substantially from top to bottom.

4. The cooking appliance of claim 1, wherein:
said at least one vapor aperture is two vapor apertures, said vapor apertures being oriented substantially vertically.

5. The cooking appliance of claim 1, further comprising:
a cover releasably engageable with said container, said cover having a throughbore formed therein, said throughbore being in fluid communication with said vapor conduit and said hub of said blade assembly.

6. The cooking appliance of claim 1, wherein:
said blade assembly includes a pair of opposed, generally S-shaped blades.

7. The cooking appliance of claim 1, wherein:
said blade assembly is releasably affixed to a substantially vertical post extending from a bottom of said container.

8. A cooking appliance, comprising:
a base;
an electric motor housed in said base, said electric motor including an output shaft extending upwards from said base;
a container engageable with said base and configured to receive one or more food ingredients;
a blade assembly rotatably coupled to said output shaft of said motor and mounted within said container, said blade assembly including a body having a top hub defining a passageway leading to an interior of said body;
a chamber for holding a volume of liquid;
a heater associated with said chamber for converting said liquid into a cooking vapor; and
a vapor flow channel, said vapor flow channel having an inlet in fluid communication with said chamber and an outlet in fluid communication with said top hub of said blade assembly;
wherein said blade assembly includes at least one vapor aperture adjacent to a top of said body and at least one vapor aperture adjacent to a bottom of said body, said vapor apertures forming passageways between said interior of said body and an interior of said container for allowing the egress of cooking vapor from said interior of said body into said container.

9. The cooking appliance of claim 8, wherein:
said vapor aperture and said vapor outlet are configured to circulate said cooking vapor within said container substantially from top to bottom.

10. The cooking appliance of claim 8, wherein:
said at least one vapor aperture is two vapor apertures, said vapor apertures being oriented substantially vertically.

11. The cooking appliance of claim 8, further comprising:
a cover releasably engageable with said container, said cover having a throughbore formed therein, said throughbore being in fluid communication with said vapor flow channel and said hub of said blade assembly.

12. The cooking appliance of claim 8, further comprising:
a microprocessor for controlling a duration and sequence of a cooking step and a processing step.

13. The cooking appliance of claim 8, further comprising:
a cover releasably engageable with said container, said cover including a seal element for forming a substantially liquid tight and gas tight seal between said cover and said container.

* * * * *

UNITED STATES PATENT AND TRADEMARK OFFICE
CERTIFICATE OF CORRECTION

PATENT NO.         : 8,826,805 B2                                           Page 1 of 1
APPLICATION NO.    : 13/397990
DATED              : September 9, 2014
INVENTOR(S)        : Leo Leung et al.

It is certified that error appears in the above-identified patent and that said Letters Patent is hereby corrected as shown below:

On the title page, item (75) the Inventor "Joseoh" should be "Joseph".

Signed and Sealed this
Fifth Day of May, 2015

Michelle K. Lee
*Director of the United States Patent and Trademark Office*